(12) United States Patent
Liu et al.

(10) Patent No.: US 10,366,467 B1
(45) Date of Patent: *Jul. 30, 2019

(54) METHOD AND APPARATUS FOR ACCESSING COMPRESSED DATA AND/OR UNCOMPRESSED DATA OF IMAGE FRAME IN FRAME BUFFER

(71) Applicant: MEDIATEK INC., Hsin-Chu (TW)

(72) Inventors: Tsu-Ming Liu, Hsinchu (TW); Ping Chao, Taipei (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 40 days.

This patent is subject to a terminal disclaimer.

(21) Appl. No.: 15/678,118

(22) Filed: Aug. 16, 2017

Related U.S. Application Data (63) Continuation of application No. 14/574,274, filed on Dec. 17, 2014, now Pat. No. 9,767,529.

(60) Provisional application No. 61/917,478, filed on Dec. 18, 2013.

(51) Int. Cl.
  *G06T 1/60* (2006.01)
  *G06T 9/00* (2006.01)
  *G09G 5/00* (2006.01)

(52) U.S. Cl.
  CPC .............. *G06T 1/60* (2013.01); *G06T 9/00* (2013.01); *G09G 5/001* (2013.01); *G09G 2360/12* (2013.01); *G09G 2360/18* (2013.01)

(58) Field of Classification Search
  CPC ..................................... G06T 1/60; G06T 9/00
  USPC ........................................................ 345/547
  See application file for complete search history.

(56) References Cited

U.S. PATENT DOCUMENTS

| | | | | |
|---|---|---|---|---|
| 5,467,087 A | * | 11/1995 | Chu ..................... | H03M 7/3086 341/51 |
| 2002/0149596 A1 | * | 10/2002 | Champion ................ | G06T 1/60 345/545 |
| 2004/0056783 A1 | * | 3/2004 | Fallon ....................... | G06T 9/00 341/51 |
| 2008/0175490 A1 | * | 7/2008 | Cho .......................... | G06T 9/00 382/232 |
| 2009/0193167 A1 | * | 7/2009 | Chen ...................... | G09G 5/001 710/244 |
| 2009/0265744 A1 | * | 10/2009 | Singh .................. | H04N 21/2402 725/105 |
| 2010/0310169 A1 | * | 12/2010 | Liu ...................... | H04N 19/647 382/171 |
| 2014/0204107 A1 | * | 7/2014 | Laksono ................ | H04N 19/46 345/547 |

* cited by examiner

*Primary Examiner* — Hai Tao Sun
(74) *Attorney, Agent, or Firm* — Winston Hsu (57) ABSTRACT

A method for storing data of an image frame into a frame buffer includes at least the following steps: dividing the image frame into a plurality of access units, each having at least one encoding unit, wherein each encoding unit is a unit for data compression; and performing the data compression upon each encoding unit of the image frame, and generating an output bitstream to the frame buffer based on a data compression result of the encoding unit. A processing result of each access unit includes each output bitstream of the at least one encoding unit included in the access unit; a plurality of processing results of the access units are stored in a plurality of storage spaces allocated in the frame buffer, respectively; and a size of each of the storage spaces is equal to a size of a corresponding access unit.

32 Claims, 6 Drawing Sheets

METHOD AND APPARATUS FOR ACCESSING COMPRESSED DATA AND/OR UNCOMPRESSED DATA OF IMAGE FRAME IN FRAME BUFFER

CROSS REFERENCE TO RELATED APPLICATION

This is a continuation of U.S. patent application Ser. No. 14/574,274 filed on Dec. 17, 2014, which claims the benefit of U.S. provisional application No. 61/917,478 filed on Dec. 18, 2013. The entire contents of the related applications, including U.S. patent application Ser. No. 14/574,274 and U.S. provisional application No. 61/917,478, are incorporated herein by reference.

BACKGROUND

The disclosed embodiments of the present invention relate to reading data from and writing data into a storage device, and more particularly, to a method and apparatus for accessing compressed data and/or uncompressed data of an image frame in a frame buffer.

A video decoder may decode an encoded bitstream to generate a plurality of image frames to be processed by subsequent procedures. For example, the image frames generated from the video decoder may be processed by a graphic processor or a display processor. In a conventional design, the video decoder writes each image frame into a frame buffer, and the graphic processor/display processor reads each image frame from the frame buffer for further processing. To reduce the memory bus bandwidth requirement of the frame buffer, a data compression scheme may be employed to compress each image frame and generate a compressed image frame to the frame buffer. However, if data of the compressed image frame is continuously stored in the frame buffer, the graphic processor/display processor may have difficulty in randomly accessing data of the compressed image frame in the frame buffer.

SUMMARY

In accordance with exemplary embodiments of the present invention, a method and apparatus for accessing compressed data and/or uncompressed data of an image frame in a frame buffer are proposed.

According to a first aspect of the present invention, an exemplary method for storing data of an image frame into a frame buffer is disclosed. The exemplary method includes: dividing the image frame into a plurality of access units, each having at least one encoding unit, wherein each encoding unit is a unit for data compression; and performing the data compression upon each encoding unit of the image frame, and generating an output bitstream to the frame buffer based on a data compression result of the encoding unit. A processing result of each access unit includes each output bitstream of the at least one encoding unit included in the access unit; a plurality of processing results of the access units are stored in a plurality of storage spaces allocated in the frame buffer, respectively; and a size of each of the storage spaces is equal to a size of a corresponding access unit.

According to a second aspect of the present invention, an exemplary method for storing data of an image frame into a frame buffer is disclosed. The exemplary method includes: dividing the image frame into a plurality of encoding units, each being a unit for data compression; and performing the data compression upon each encoding unit of the image frame, and generating an output bitstream to the frame buffer based on a data compression result of the encoding unit. The encoding units include a first encoding unit and a second encoding unit; the first encoding unit and the second encoding unit are adjacent in a compression order; a first output bitstream generated based on a data compression result of a first encoding unit and a second output bitstream generated based on a data compression result of a second encoding unit are stored in the frame buffer; and a bit-level end address of the stored first output bitstream in the frame buffer is not immediately followed by a bit-level start address of the stored second output bitstream in the frame buffer.

According to a third aspect of the present invention, an exemplary method for obtaining data of an image frame from a frame buffer is disclosed. The exemplary method includes: reading a stored output bitstream from a specific storage space of a plurality of storage spaces allocated in the frame buffer, wherein the stored output bitstream is generated based on a data compression result of a specific encoding unit of a specific access unit, the image frame is divided into a plurality of access units each having at least one encoding unit, each encoding unit is a unit for data compression, a processing result of each access unit includes each output bitstream of the at least one encoding unit included in the access unit, a plurality of processing results of the access units are stored in the storage spaces, respectively, and a size of each of the storage spaces is equal to a size of a corresponding access unit; and deriving data of the encoding unit from the stored output bitstream read from the frame buffer.

According to a fourth aspect of the present invention, an exemplary method for obtaining data of an image frame from a frame buffer is disclosed. The exemplary method includes: reading a first stored output bitstream from the frame buffer, wherein the first stored output bitstream is generated based on a data compression result of a first encoding unit of the image frame; deriving data of the first encoding unit from the first stored output bitstream read from the frame buffer; reading a second stored output bitstream from the frame buffer, wherein the second stored output bitstream is generated based on a data compression result of a second encoding unit of the image frame; and deriving data of the second encoding unit from the second stored output bitstream read from the frame buffer. The image frame is divided into a plurality of encoding units, each encoding unit is a unit for data compression, the first encoding unit and the second encoding unit are adjacent in a compression order, and a bit-level end address of the first stored output bitstream in the frame buffer is not immediately followed by a bit-level start address of the second stored output bitstream in the frame buffer.

According to a fifth aspect of the present invention, an exemplary image frame buffering apparatus is disclosed. The exemplary image frame buffering apparatus includes a frame buffer and a processing circuit. The processing circuit is configured to divide an image frame into a plurality of access units, each having at least one encoding unit, wherein each encoding unit is a unit for data compression; and further configured to perform the data compression upon each encoding unit of the image frame, and generate an output bitstream to the frame buffer based on a data compression result of the encoding unit. A processing result of each access unit includes each output bitstream of the at least one encoding unit included in the access unit; the processing circuit stores a plurality of processing results of the access units in a plurality of storage spaces allocated in the frame buffer, respectively; and a size of each of the storage spaces is equal to a size of a corresponding access unit.

According to a sixth aspect of the present invention, an exemplary image frame buffering apparatus is disclosed. The exemplary image frame buffering apparatus includes a frame buffer and a processing circuit. The processing circuit is configured to divide the image frame into a plurality of encoding units each being a unit for data compression; and further configured to perform the data compression upon each encoding unit of the image frame, and generate an output bitstream to the frame buffer based on a data compression result of the encoding unit. The encoding units include a first encoding unit and a second encoding unit; the first encoding unit and the second encoding unit are adjacent in a compression order; a first output bitstream generated based on a data compression result of a first encoding unit and a second output bitstream generated based on a data compression result of a second encoding unit are stored in the frame buffer; and a bit-level end address of the stored first output bitstream in the frame buffer is not immediately followed by a bit-level start address of the stored second output bitstream in the frame buffer.

According to a seventh aspect of the present invention, an exemplary image frame buffering apparatus is disclosed. The exemplary image frame buffering apparatus includes a frame buffer and a processing circuit. The processing circuit is configured to read a stored output bitstream from a specific storage space of a plurality of storage spaces allocated in the frame buffer, and derive data of the encoding unit from the stored output bitstream read from the frame buffer. The stored output bitstream is generated based on a data compression result of a specific encoding unit of a specific access unit, an image frame is divided into a plurality of access units each having at least one encoding unit, each encoding unit is a unit for data compression, a processing result of each access unit includes each output bitstream of the at least one encoding unit included in the access unit, a plurality of processing results of the access units are stored in the storage spaces, respectively, and a size of each of the storage spaces is equal to a size of a corresponding access unit.

According to an eighth aspect of the present invention, an exemplary image frame buffering apparatus is disclosed. The exemplary image frame buffering apparatus includes a frame buffer and a processing circuit. The processing circuit is configured to read a first stored output bitstream from the frame buffer and derive data of a first encoding unit from the first stored output bitstream read from the frame buffer, and read a second stored output bitstream from the frame buffer and derive data of a second encoding unit from the second stored output bitstream read from the frame buffer. The first stored output bitstream is generated based on a data compression result of the first encoding unit of an image frame; the second stored output bitstream is generated based on a data compression result of the second encoding unit of the image frame; the image frame is divided into a plurality of encoding units each being a unit for data compression, the first encoding unit and the second encoding unit are adjacent in a compression order, and a bit-level end address of the first stored output bitstream in the frame buffer is not immediately followed by a bit-level start address of the second stored output bitstream in the frame buffer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
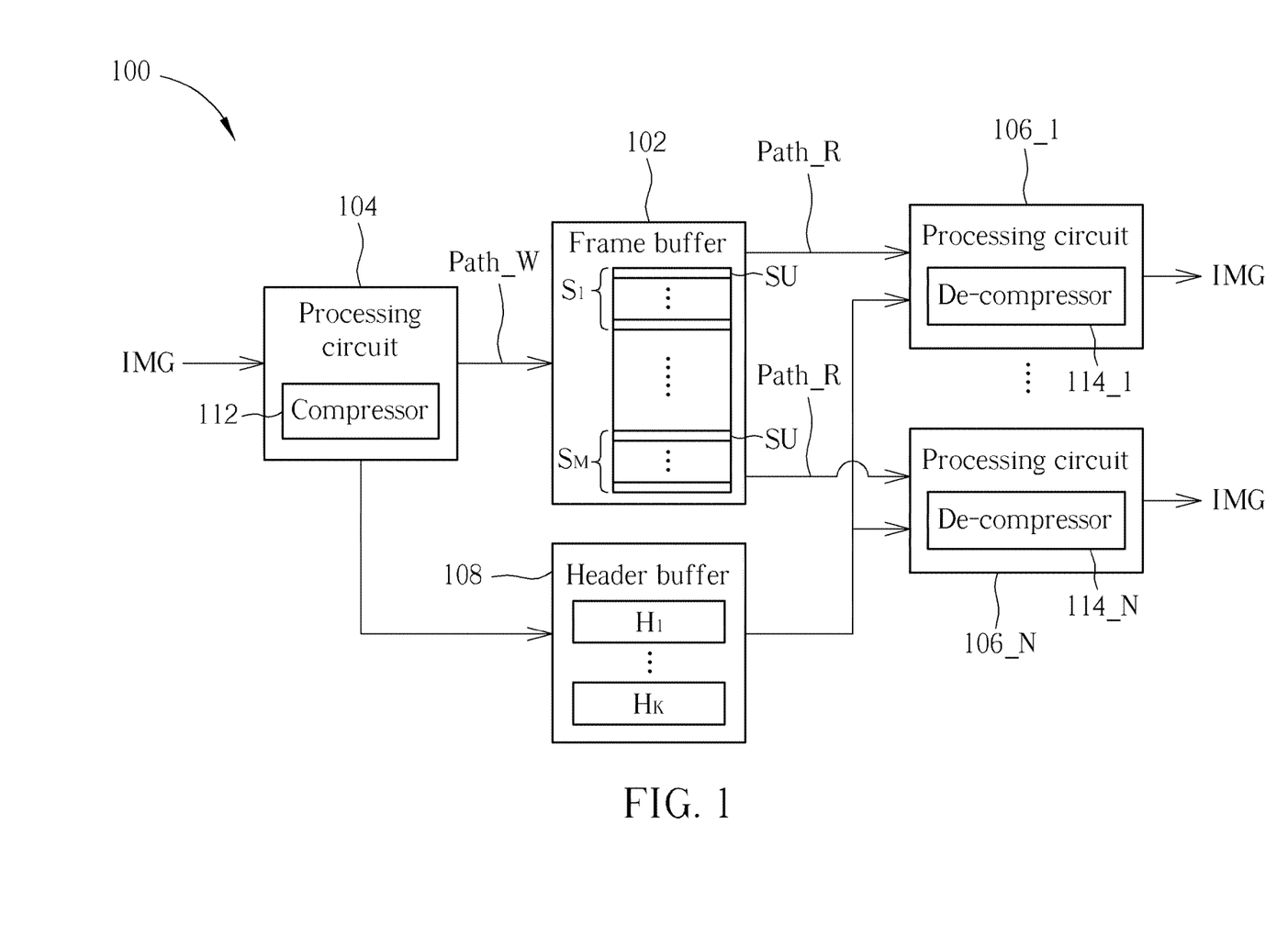
FIG. 1 is a block diagram illustrating an image frame buffering apparatus according to an embodiment of the present invention.

FIG. 1 is a block diagram illustrating an image frame buffering apparatus according to an embodiment of the present invention. The image frame buffering apparatus 100 includes a frame buffer 102, a processing circuit 104 preceding the frame buffer 102, at least one processing circuit (e.g., a single processing circuit 106_1 or multiple processing circuits 106_1-106_N) following the frame buffer 102, and a header buffer 108. By way of example, but not limitation, one or both of frame buffer 102 and header buffer 108 may be implemented using a dynamic random access memory (DRAM). The processing circuit 104 is located in a write path Path_W for writing data into the frame buffer 102, and each of the processing circuits 106_1-106_N is located in a read path Path_R for reading stored data from the frame buffer 102.

The processing circuit 104 receives an image frame IMG from a preceding circuit (e.g., a video decoder or other video source), and includes a compressor 112 configured to perform data compression (e.g., lossless compression) upon the image frame IMG. In this embodiment, the image frame IMG is divided into a plurality of access units, and each of the access units has at least one encoding unit included therein. Each encoding unit is a unit for data compression. Hence, all pixels in the same encoding unit are highly correlated, and each pixel of the encoding unit only refers to other pixels of the same encoding unit for compression. In other words, compression of pixel data of one encoding unit is independent of compression of pixel data of another encoding unit. Similarly, decompression of compressed pixel data of one encoding unit is independent of decompression of compressed pixel data of another encoding unit. Each encoding unit may have S×T pixels, and each access unit may have Y×Z pixels, where S, T, Y and Z are positive integers, and Y×Z is an integer multiple of S×T. Thus, the size of one access unit may be equal to or larger than the size of one encoding unit, depending upon actual design consideration. In one exemplary design, each encoding unit may have 16×4 pixels, and each access unit may have 16×8 pixels. Thus, each access unit is composed of two encoding units. It should be noted that the access unit size and the encoding unit size can be adjusted, depending upon actual design consideration.

The compressor 112 performs data compression upon each encoding unit of the image frame IMG, and generates an output bitstream to the frame buffer 102 based on a data compression result of the encoding unit. It should be noted that the output bitstream may include a compressed data and/or an uncompressed data of the encoding unit based on the size of the compressed data generated by data compression. For example, when the data compression result of the encoding unit indicates that the size of the compressed data of the encoding unit is within an acceptable range, meaning that the compression ratio $$CR = \frac{\text{Uncompressed data size}}{\text{Compressed data size}}$$

is good due to having a larger value, the aforementioned output bitstream stored into the frame buffer may include the compressed data of the encoding unit. For another example, when the data compression result of the encoding unit indicates that the size of the compressed data of the encoding unit is beyond the acceptable range, meaning that the compression ratio $$CR = \frac{\text{Uncompressed data size}}{\text{Compressed data size}}$$

is bad due to having a smaller value, the aforementioned output bitstream may include the uncompressed data (i.e., original pixel data) of the encoding unit. In this embodiment, when the size of the compressed data of the encoding unit is close to or larger than the size of the uncompressed data of the encoding unit, the uncompressed data of the encoding unit is selected as an output to the frame buffer 102.

The buffer size of the frame buffer 102 is not smaller than the size of the image frame 104. More specifically, to achieve random access in the frame buffer 102, the present invention proposes using a frame buffer that is large enough for buffering all uncompressed data of an image frame to be processed by the processing circuit 104. As shown in FIG. 1, the frame buffer 102 is configured to have a plurality of storage spaces $S_1$-$S_M$. The value of M is equal to the number of access units in the image frame IMG. A processing result of each access unit includes output bitstream(s) of all encoding unit(s) included in the access unit, where an output bitstream of an encoding unit may include a compressed data or an uncompressed data of the encoding unit. The processing circuit 104 stores a plurality of processing results of the access units into the storage spaces $S_1$-$S_M$ allocated in the frame buffer 102, respectively, where the size of each of the storage spaces $S_1$-$S_M$ is equal to the size of a corresponding access unit. That is, a storage space can be exactly filled with uncompressed data of a corresponding access unit or partially filled with compressed data of the corresponding access unit. Hence, processing results of access units that are adjacent in a compression order may not be continuously stored in the frame buffer 102. Instead, processing results of access units that are adjacent in the compression order are stored into two adjacent storage spaces, where each of the two adjacent storage spaces may be exactly filled with a processing result of a corresponding access unit if the processing result includes uncompressed data of all encoding units in the corresponding access unit, and each of the two adjacent storage spaces may be partially filled with the processing result of the corresponding access unit if the processing result has compressed data of at least one encoding unit in the corresponding access unit. Since the arrangement of storage spaces $S_1$-$S_M$ in the frame buffer 102 is configured based on the processing order of access units in the image frame IMG and the storage spaces $S_1$-$S_M$ are allocated for storing processing results of respective access units in the image frame IMG, the processing result of any access unit can be randomly accessed in the frame buffer 102.

Further, each of the storage spaces $S_1$-$S_M$ is divided into a plurality of storage units SU, each having the same size. For example, each storage unit SU may have 16 bytes. It should be noted that the storage unit size can be adjusted, depending upon the actual design consideration. Suppose that the bit depth of each pixel in the image frame IMG is 8 bits. A first output bitstream (e.g., compressed data or uncompressed data) generated based on a data compression result of a first encoding unit included in a specific access unit is stored into a first region of a specific storage space, and a second output bitstream (e.g., compressed data or uncompressed data) generated based on a data compression result of a second encoding unit included in the specific access unit is stored into a second region of the same specific storage space, where the first encoding unit and the second encoding unit are adjacent in a compression order, the first region and the second region are non-overlapping, and the number of storage units SU included in each of the first region and the second region is an integer value. Hence, output bitstreams generated based on compression results of encoding units belonging to the same access unit and adjacent in the compression order may not continuously stored in a storage space allocated in the frame buffer 102. For example, the frame buffer 102 may be implemented using a DRAM. Each 16-byte DRAM word in the frame buffer 102 is accessed based on a designated word-level address, and is composed of a plurality of bits (i.e., 16×8 bits) each having a unique bit-level address in the frame buffer 102. Though the first encoding unit and the second encoding unit are adjacent in the compression order, a bit-level end address of the first stored output bitstream in the frame buffer 102 may not be immediately followed by a bit-level start address of the second stored output bitstream in the frame buffer 102.

In this embodiment, output bitstreams generated based on compression results of encoding units belonging to the same access unit and adjacent in the compression order are stored into two non-overlapping regions each having an integer number of storage units SU. Hence, a region may not be filled with an output bitstream generated based on a data compression result of a corresponding encoding unit. Since non-overlapping regions in the same storage space are used for buffering output bitstreams generated based on data compression results of different encoding units, the stored output bitstream of any encoding unit of an access unit can be more easily accessed in a storage space allocated for buffering a processing result of the access unit.

In this embodiment, the compressor 112 may employ a lossless compression scheme to generate a compressed data of an encoding unit. Though each of the encoding units has the same size (e.g., 16×4×8 bits if bit depth=8 bits, or 16×4×10 bits if bit depth=10 bits), the sizes of compressed data generated from applying lossless data compression to the equal-sized encoding units may be different from one another due to different image contents of the equal-sized encoding units. In other words, non-overlapping regions used in a storage space for buffering output bitstreams generated based on lossless data compression results of encoding units may have different sizes (e.g., different numbers of storage units SU). Since the non-overlapping region sizes are not fixed and cannot be known beforehand, a header of each encoding unit is therefore recorded in the header buffer 108 to indicate a size of a region in which an output bitstream of the encoding unit is stored. Hence, the header buffer 108 is configured to store a plurality of headers $H_1$-$H_K$, where the value of K is equal to the number of encoding units in the image frame IMG. With the help of the region size information, a stored output bitstream of any encoding unit of an access unit can be correctly retrieved from a storage space used for buffering a processing result of the access unit.

Based on the proposed data storage layout in the frame buffer 102, any of the processing circuits 106_1-106_N can easily obtain desired data of an encoding unit from the frame buffer 102. For example, the processing circuit 106_1 is coupled to a graphic processor, and is used to provide data of the image frame IMG to the graphic processor for further processing. The processing circuit 106_N is coupled to a display processor, and is used to provide data of the image frame IMG to the display processor for further processing. In this embodiment, the processing circuits 106_1-106_N have de-compressors 114_1-114_N, respectively. Each of the de-compressors 114_1-114_N employs a data de-compression scheme matching the data compression scheme (e.g., lossless compression) employed by the compressor 112. When one of the graphic processor and the display processor requests data of a target encoding unit in the image frame IMG, a corresponding processing circuit identifies a target storage space in the storage spaces $S_1$-$S_M$ that stores a processing result of a target access unit having the target encoding unit included therein, refers to headers of all encoding units in the target access unit to know the actual data arrangement of the target storage space in the frame buffer 102, and reads a stored output bitstream of the target encoding unit from a target region in the target storage space according to a header of the target encoding unit that indicates the size of the target region to be accessed (i.e., the number of storage units SU included in the target region).

When the size information recorded in the header of the target encoding unit indicates that the stored output bitstream of the target encoding unit is a compressed data of the target encoding unit, a corresponding de-compressor is used to apply data decompression to the compressed data to obtain a lossless result that is identical to the uncompressed data of the target encoding unit. When the size information recorded in the header of the target encoding unit indicates that the stored output bitstream of the target encoding unit is an uncompressed data of the target encoding unit, the data decompression is bypassed. For better understanding of technical features of the present invention, an example of the proposed data storage layout in the frame buffer 102 is detailed as below.

Figure 2:
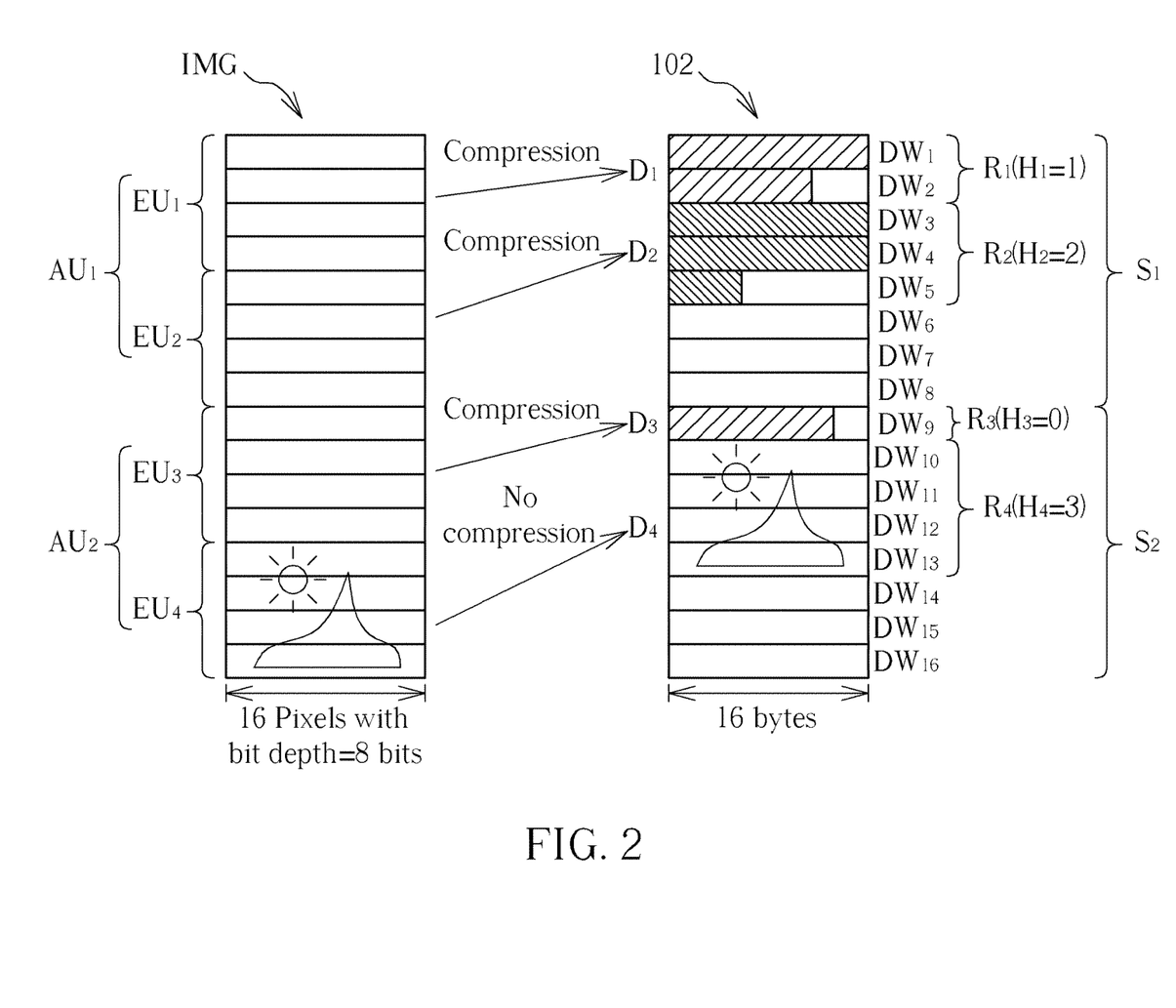
FIG. 2 is a diagram illustrating an exemplary data storage layout in the frame buffer that is used for storing a luminance frame according to an embodiment of the present invention.

FIG. 2 is a diagram illustrating an exemplary data storage layout in the frame buffer 102 that is used for storing a luminance frame according to an embodiment of the present invention. In this example, the image frame IMG is a luminance (Y) frame corresponding to a YUV420 format, the bit depth is 8 bits, the size of each encoding unit is 16×4, and the size of each access unit is 16×8. Hence, one encoding unit of the luminance frame is composed of 64 luminance pixels (i.e., luminance samples). For clarity and simplicity, only two access units $AU_1$ and $AU_2$ and four encoding units $EU_1$, $EU_2$, $EU_3$, $EU_4$ are shown in FIG. 2, where the access unit $AU_1$ is composed of two encoding units $EU_1$ and $EU_2$, and the access unit $AU_2$ is composed of two encoding units $EU_3$ and $EU_4$.

The frame buffer 102 has two storage spaces $S_1$ and $S_2$ sequentially allocated therein, where the size of the storage space $S_1$ is equal to the size of the access unit $AU_1$, and the size of the storage space $S_2$ is equal to the size of the access unit $AU_2$. In this example, since the access unit size is 16×8×8 bits, the size of each storage space allocated in the frame buffer 102 is therefore set by 16×8 bytes. Assume that the frame buffer 102 is implemented using a DRAM. As shown in FIG. 2, the frame buffer 102 has a plurality of 16-byte DRAM words $DW_1$-$DW_{16}$. Specifically, the storage space $S_1$ is composed of an integer number of DRAM words (e.g., $DW_1$-$DW_8$), and the storage space $S_2$ is also composed of an integer number of DRAM words (e.g., $DW_9$-$DW_{16}$).

In accordance with the compression order (i.e., the encoding order), the encoding units $EU_1$-$EU_4$ will be processed by the compressor 112 of the processing circuit 104 one by one. Hence, the compressor 112 performs data compression (e.g., lossless compression) upon the encoding unit $EU_1$ of the access unit $AU_1$, and generates a data compression result (e.g., a compressed data $D_1$) of the encoding unit $EU_1$. In this example, the processing circuit 104 finds that the size of the compressed data $D_1$ is larger than 128 bits (i.e., one 16-byte DRAM word) but not larger than 2×128 bits (i.e., two 16-byte DRAM words). Hence, the processing circuit 104 determines that the size of the compressed data $D_1$ is within an acceptable range, and therefore stores an output bitstream of the compressed data $D_1$ into a region $R_1$ composed of two DRAM words $DW_1$ and $DW_2$.

The encoding units $EU_1$ and $EU_2$ are adjacent in the compression order. Next, the compressor 112 performs data compression (e.g., lossless compression) upon the encoding unit $EU_2$ of the access unit $AU_1$, and generates a data compression result (e.g., a compressed data $D_2$) of the encoding unit $EU_2$. In this example, the processing circuit 104 finds that the size of the compressed data $D_2$ is larger than 2×128 bits (i.e., two 16-byte DRAM words) but not larger than 3×128 bits (i.e., three 16-byte DRAM words). Hence, the processing circuit 104 determines that the size of the compressed data $D_2$ is within the acceptable range, and therefore stores an output bitstream of the compressed data $D_2$ into a region $R_2$ composed of three DRAM words $DW_3$-$DW_5$. It should be noted that the regions $R_1$ and $R_2$ are non-overlapping, and each of the regions $R_1$ and $R_2$ has an integer number of DRAM words. As can be seen from FIG. 2, the DRAM word $DW_2$ has a blank area left unused, and the DRAM word $DW_5$ also has a blank area left unused. A word-level end address of the compressed data $D_1$ in the storage space $S_1$ is an address of the DRAM word $DW_2$, and a word-level start address of the compressed data $D_2$ in the same storage space $S_1$ is an address of the DRAM word DW$_3$. Hence, the word-level end address of the compressed data D$_1$ in the storage space S$_1$ is immediately followed by the word-level start address of the compressed data D$_3$ in the same storage space S$_1$. However, a bit-level end address of the compressed data D$_1$ in the storage space S$_1$ is not immediately followed by a bit-level start address of the compressed data D$_2$ in the same storage space S$_1$. In this way, random access in the storage space S$_1$ of the frame buffer 102 can be achieved based on the DRAM word access.

The encoding units EU$_2$ and EU$_3$ are adjacent in the compression order. Next, the compressor 112 performs data compression (e.g., lossless compression) upon the encoding unit EU$_3$ of the access unit AU$_2$, and generates a data compression result (e.g., a compressed data D$_3$) of the encoding unit EU$_3$. In this example, the processing circuit 104 finds that the size of the compressed data D$_3$ is not larger than 128 bits (i.e., one 16-byte DRAM word). Hence, the processing circuit 104 determines that the size of the compressed data D$_3$ is within the acceptable range, and therefore stores an output bitstream of the compressed data D$_3$ into a region R$_3$ composed of one DRAM word DW$_9$. Though the DRAM words DW$_5$-DW$_8$ of the storage space S$_1$ have unused storage areas, the frame buffer 102 is used to store the compressed data D$_3$ from a start address of another storage space S$_2$. As can be seen from FIG. 2, a word-level end address of the compressed data D$_2$ in the storage space S$_1$ (i.e., an address of the DRAM word DW$_5$) is not immediately followed by a word-level start address of the compressed data D$_3$ in another storage space S$_2$ (i.e., an address of the DRAM word DW$_9$). This also implies that a bit-level end address of the compressed data D$_2$ in the storage space S$_1$ is not immediately followed by a bit-level start address of the compressed data D$_3$ in another storage space S$_2$.

The encoding units EU$_3$ and EU$_4$ are adjacent in the compression order. Next, the compressor 112 performs data compression (e.g., lossless compression) upon the encoding unit EU$_4$ of the access unit AU$_2$, and generates a data compression result (e.g., a compressed data) of the encoding unit EU$_4$. In this example, the processing circuit 104 finds that the size of the compressed data generated from compressing the encoding unit EU$_4$ is larger than 3×128 bits (i.e., three 16-byte DRAM words). Hence, the processing circuit 104 determines that the size of the compressed data is beyond the acceptable range, and therefore stores an output bitstream of the uncompressed data D$_4$ of the encoding unit EU$_4$ into a region R$_4$ composed of four DRAM words DW$_{10}$-DW$_{13}$. It should be noted that the regions R$_3$ and R$_4$ are non-overlapping, and each of the regions R$_3$ and R$_4$ has an integer number of DRAM words. As can be seen from FIG. 2, the DRAM word DW$_9$ has a blank area left unused. A word-level end address of the compressed data D$_3$ in the storage space S$_2$ is an address of the DRAM word DW$_9$, and a word-level start address of the uncompressed data D$_4$ in the same storage space S$_2$ is an address of the DRAM word DW$_{10}$. Hence, the word-level end address of the compressed data D$_3$ in the storage space S$_2$ is immediately followed by the word-level start address of the uncompressed data D$_4$ in the same storage space S$_2$. However, a bit-level end address of the compressed data D$_3$ in the storage space S$_2$ is not immediately followed by a bit-level start address of the uncompressed data D$_4$ in the same storage space S$_2$. In this way, random access in the storage space S$_2$ of the frame buffer 102 can be achieved based on the DRAM word access.

To facilitate random access in each storage space, the processing circuit 104 further sets a header of each encoding unit to indicate the number of storage units (e.g., 16-byte DRAM words) included in a region that records an output bitstream generated based on a data compression result of the encoding unit, and then stores the header of the encoding unit into the header buffer 108 for later use. For example, the number of 16-byte DRAM words used for storing an output bitstream generated based on a data compression result of an encoding unit depends on the size of the output bitstream generated based on the data compression result of the encoding unit. With regard to the example shown in FIG. 2, an output bitstream generated based on a data compression result of each encoding unit is stored in a region with a region size not smaller than and closest to the size of the output bitstream to be stored, where the region is composed of an integer number of 16-byte DRAM words. Hence, the largest region has four 16-byte DRAM words, and the smallest region has only one 16-byte DRAM word. In a case where the header of each encoding unit includes two bits, the header of each encoding unit may be set based on the following rules.

| Header (2 bits) | Syntax (8-bit video) |
| --- | --- |
| 0 (2'b00) | bitstream size ≤ 128 bits |
| 1 (2'b01) | 128 bits < bitstream size ≤ 2 × 128 bits |
| 2 (2'b10) | 2 × 128 bits < bitstream size ≤ 3 × 128 bits |
| 3 (2'b11) | No compression (bitstream size > 3 × 128 bits) |

Hence, a two-bit header H$_1$ of the encoding unit EU$_1$ is set by "01" to indicate the second region size, a two-bit header H$_2$ of the encoding unit EU$_2$ is set by "10" to indicate the third region size, a two-bit header H$_3$ of the encoding unit EU$_3$ is set by "00" to indicate the first region size, and a two-bit header H$_4$ of the encoding unit EU$_4$ is set by "11" to indicate the fourth region size.

The above is for illustrative purposes only, and is not meant to be a limitation of the present invention. The setting of header values for different bitstream sizes may be modified, depending upon the actual design consideration. In the example shown in FIG. 2, the region size is not smaller than and is closest to the size of the output bitstream to be stored. Alternatively, the region size may not be necessarily closest to the size of the output bitstream to be stored. For example, the compressed data D$_1$ of the encoding unit EU$_1$ may be stored into a region with three DRAM words DW$_1$-DW$_3$, and the compressed data D$_2$ of the encoding unit EU$_1$ may be stored into another region with four DRAM words DW$_4$-DW$_7$. The mapping between header values and region sizes should be properly defined. In this way, the headers H$_1$ and H$_2$ are properly set to indicate that the compressed data D$_1$ of the encoding unit EU$_1$ is stored in three DRAM words and the compressed data D$_2$ of the encoding unit EU$_2$ is stored in four DRAM words. This also falls within the scope of the present invention.

When data of the encoding unit EU$_1$ is requested by a processor (e.g., graphic processor), a corresponding processing circuit (e.g., processing circuit 106_1) can easily determine that an output bitstream generated based on a data compression result of the encoding unit EU$_1$ is stored in the storage space S$_1$ due to the fact that the encoding unit EU$_1$ belongs to the access unit AU$_1$. Next, the processing circuit 106_1 reads the header buffer 108 to obtain the headers H$_1$ and H$_2$ to thereby determine the actual data arrangement in the storage space S$_1$, and refers to the header H$_1$ to determine that the output bitstream generated based on the data compression result of the encoding unit EU$_1$ is a compressed data stored in two DRAM words. The processing circuit 106_1 refers to the actual data arrangement in the storage space $S_1$ to identify the location of the requested data stored in the storage space $S_1$. Since the encoding unit $EU_1$ is the first encoding unit in the access unit $AU_1$ and the requested data is stored in two DRAM words, the first two DRAM words $DW_1$ and $DW_2$ of the storage space $S_1$ are read to obtain the compressed data $D_1$. Hence, the compressed data $D_1$ is correctly read from the region $R_1$ and then decompressed by a corresponding decompressor (e.g., de-compressor 114_1).

When data of the encoding unit $EU_2$ is requested by a processor (e.g., graphic processor), a corresponding processing circuit (e.g., processing circuit 106_1) can easily determine that an output bitstream generated based on a data compression result of the encoding unit $EU_2$ is stored in the storage space $S_1$ due to the fact that the encoding unit $EU_2$ belongs to the access unit $AU_1$. Next, the processing circuit 106_1 reads the header buffer 108 to obtain the headers $H_1$ and $H_2$ for determining the actual data arrangement in the storage space $S_1$. Specifically, the processing circuit 106_1 refers to the header $H_1$ to determine that the output bitstream generated based on the data compression result of the encoding unit $EU_1$ is a compressed data stored in two DRAM words, and refers to the header $H_2$ to determine that the output bitstream generated based on the data compression result of the encoding unit $EU_2$ is a compressed data stored in three DRAM words. The processing circuit 106_1 refers to the actual data arrangement in the storage space $S_1$ to find the location of the requested data. Since the encoding unit $EU_2$ is the second encoding unit in the access unit $AU_1$ and the requested data is stored in three DRAM words, the DRAM words $DW_3$-$DW_5$ in the storage space $S_1$ are read to obtain the compressed data $D_2$. Hence, the compressed data $D_2$ is correctly read from the region $R_2$ and then decompressed by a corresponding de-compressor (e.g., de-compressor 114_1).

As a person skilled in the art can readily understand details of obtaining data of the encoding unit $EU_3$ and data of the encoding unit $EU_4$ after reading above paragraphs, further description is omitted here for brevity.

Figure 3:
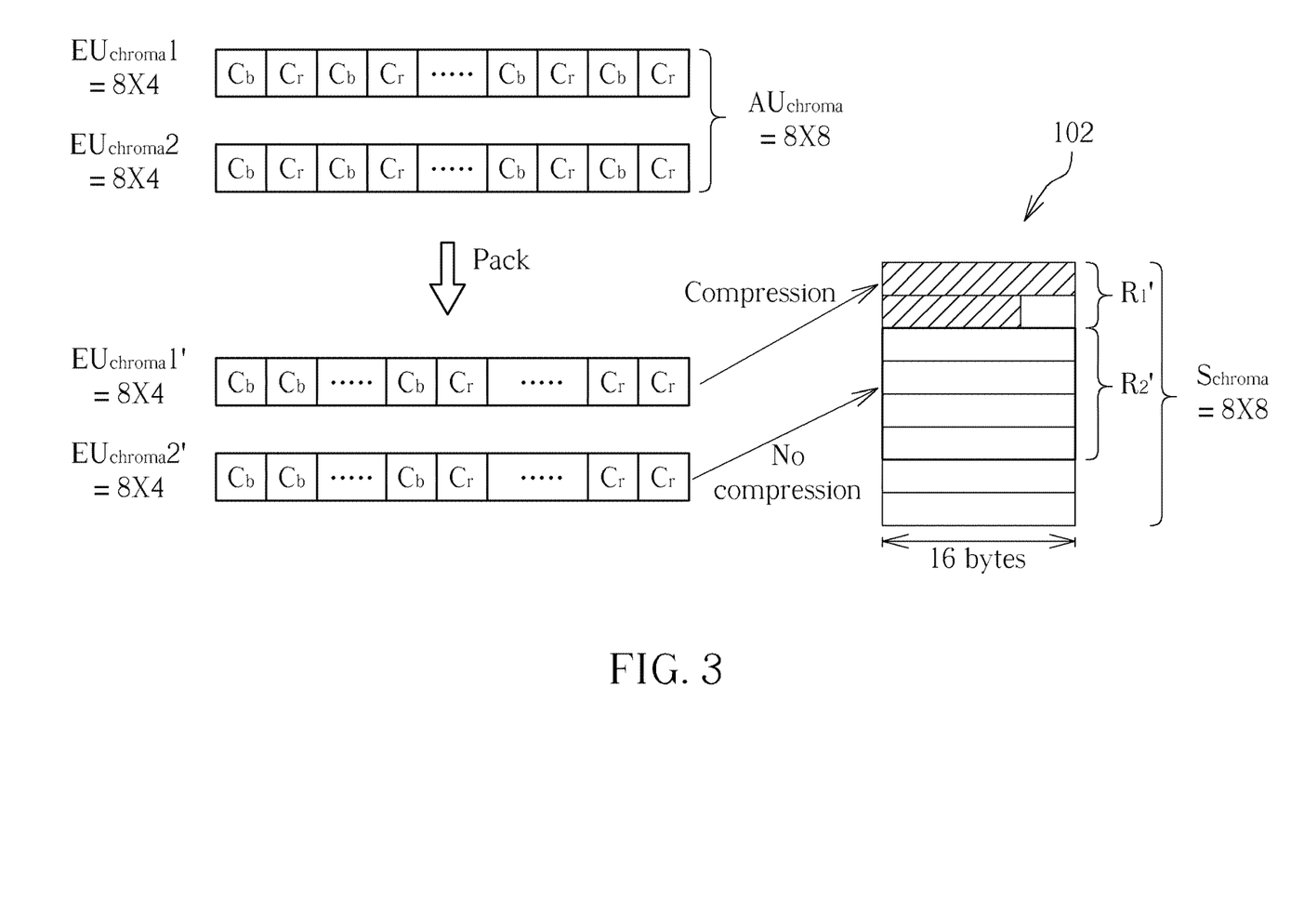
FIG. 3 is a diagram illustrating an exemplary data storage layout in the frame buffer that is used for storing a chrominance frame according to an embodiment of the present invention.

The luminance frame (which is composed of luminance (Y) pixels each including one luminance sample) and the chrominance frame (which is composed of chrominance (Cb, Cr) pixels each including one chrominance (Cb) sample and another chrominance (Cr) sample) are processed, separately. In accordance with the YUV420 format, a set of one chrominance (Cb) sample and one chrominance (Cr) sample is shared by four luminance (Y) pixels. Hence, if the size of each encoding unit composed of luminance (Y) pixels is 16×4, the size of each encoding unit composed of chrominance (Cb, Cr) pixels is 8×4. FIG. 3 is a diagram illustrating an exemplary data storage layout in the frame buffer 102 that is used for storing a chrominance frame according to an embodiment of the present invention. In this example, the image frame IMG is a chrominance (Cb, Cr) frame according to the YUV420 format, the bit depth is 8 bits, the size of each encoding unit is 8×4, and the size of one access unit is 8×8. Hence, one encoding unit of the chrominance frame is composed of 32 chrominance pixels, including 32 chrominance (Cr) samples and 32 chrominance (Cr) samples. For clarity and simplicity, only one access unit $AU_{chroma}$ and two encoding units $EU_{chroma}1$ and $EU_{chroma}2$ are shown in FIG. 3. The frame buffer 102 has a storage space $S_{chroma}$ with a size equal to the size of the access unit $AU_{chroma}$. In addition, assuming that the frame buffer 102 is implemented using a DRAM, the storage space $S_{chroma}$ is divided into a plurality of 16-byte DRAM words. Concerning each of the encoding units $EU_{chroma}1$ and $EU_{chroma}2$, the processing circuit 104 seamlessly packs two chroma streams together, such that chrominance (Cb) samples are gathered together and chrominance (Cr) samples are gathered together. Next, each of the rearranged encoding units $EU_{chroma}1'$ and $EU_{chroma}2'$ is processed by the compressor 112 of the processing circuit 104. For example, an output bitstream of compressed data of the rearranged encoding units $EU_{chroma}1'$ is stored into a region R1' in the storage space $S_{chroma}$ allocated in the frame buffer 102, and an output bitstream of uncompressed data of the rearranged encoding units $EU_{chroma}2'$ is stored into a region R2' in the storage space $S_{chroma}$ allocated in the frame buffer 102. The processing circuit 104 furthers sets headers of the rearranged encoding units $EU_{chroma}1'$ and $EU_{chroma}2'$ to indicate the number of 16-byte DRAM words in the region R1' and the number of 16-byte DRAM words in the region R2', respectively. As a person skilled in the art can readily understand details of the data storage layout used for storing the chrominance frame after reading above paragraphs directed to the data storage layout used for storing the luminance frame, further description of writing chrominance data into the frame buffer 102 and reading chrominance data from the frame buffer 102 is omitted here for brevity.

It should be noted that the present invention has no limitation on the video format and the bit depth. For example, the image frame IMG may be a luminance/chrominance frame complying with one of YV12 format, NV12 format, 444 format, 422 format, and 420 format. For another example, the bit depth may be one of 8 bits, 10 bits, and 12 bits.

When the bit depth is larger than 8 bits, the present invention further proposes reusing the aforementioned 8-bit compression method by separating an N-bit pixel (or an N-bit sample) into an 8-bit pixel (or an 8-bit sample) and an (N−8)-bit pixel (or an (N−8)-bit sample), where N>8. For example, the 8-bit pixel may include 8 most significant bits (MSBs) of the N-bit pixel, and the (N−8)-bit pixel may include (N−8) least significant bits (LSBs) of the N-bit pixel. The compressor 112 of the processing circuit 104 applies data compression to an encoding unit composed of multiple N-bit pixels (N>8), and generates an output bitstream to the frame buffer 102 based on a data compression result of the encoding unit. The image frame IMG may be a luminance frame or a chrominance frame. Assuming that the N-bit pixel is a 10-bit luminance pixel of a luminance frame, the 10-bit luminance pixel is divided into an LSB part composed of two LSB bits and an MSB part composed of 8 MSBs. When the size of each encoding unit is 16×4 (i.e., 5×128 bits), and the size of each access unit is 16×8 (i.e., 10×128 bits), LSB parts of 10-bit pixels in the same encoding unit are gathered and then directly stored into one 16-byte DRAM word, while a compressed data or an uncompressed data of MSB parts of 10-bit pixels in the same encoding unit may be stored into one or more 16-byte DRAM words based on a data compression result of the MSB parts of 10-bit pixels in the encoding unit. In other words, when an encoding unit composed of 10-bit pixels enters the compressor 112, the compressor 112 bypasses LSB parts of 10-bit pixels and compresses MSB parts of 10-bit pixels, such that a data compression result of the encoding unit includes an uncompressed data of the LSB parts of 10-bit pixels and a compressed data of the MSB parts of 10-bit pixels. The output bitstream generated from the processing circuit 104 to the frame buffer 102 may include the uncompressed data of the LSB parts of 10-bit pixels and the compressed data of the MSB parts of 10-bit pixels when the size of the compressed data of the MSB parts of 10-bit pixels is within an acceptable range, and may include the uncompressed data of the LSB parts of 10-bit pixels and an uncompressed data of the MSB parts of 10-bit pixels when the size of the compressed data of the MSB parts of 10-bit pixels is beyond the acceptable range. The operation of writing MSB parts of 10-bit pixels in an encoding unit into a frame buffer is identical to the aforementioned operation of writing 8-bit pixels in an encoding unit into a frame buffer as shown in FIG. 2. Hence, the same 8-bit compression scheme can be reused to thereby avoid a re-design work of the compressor 112. Similarly, the same 8-bit decompression scheme can be reused to thereby avoid a re-design work of the de-compressors 114_1-114_N.

Figure 4:
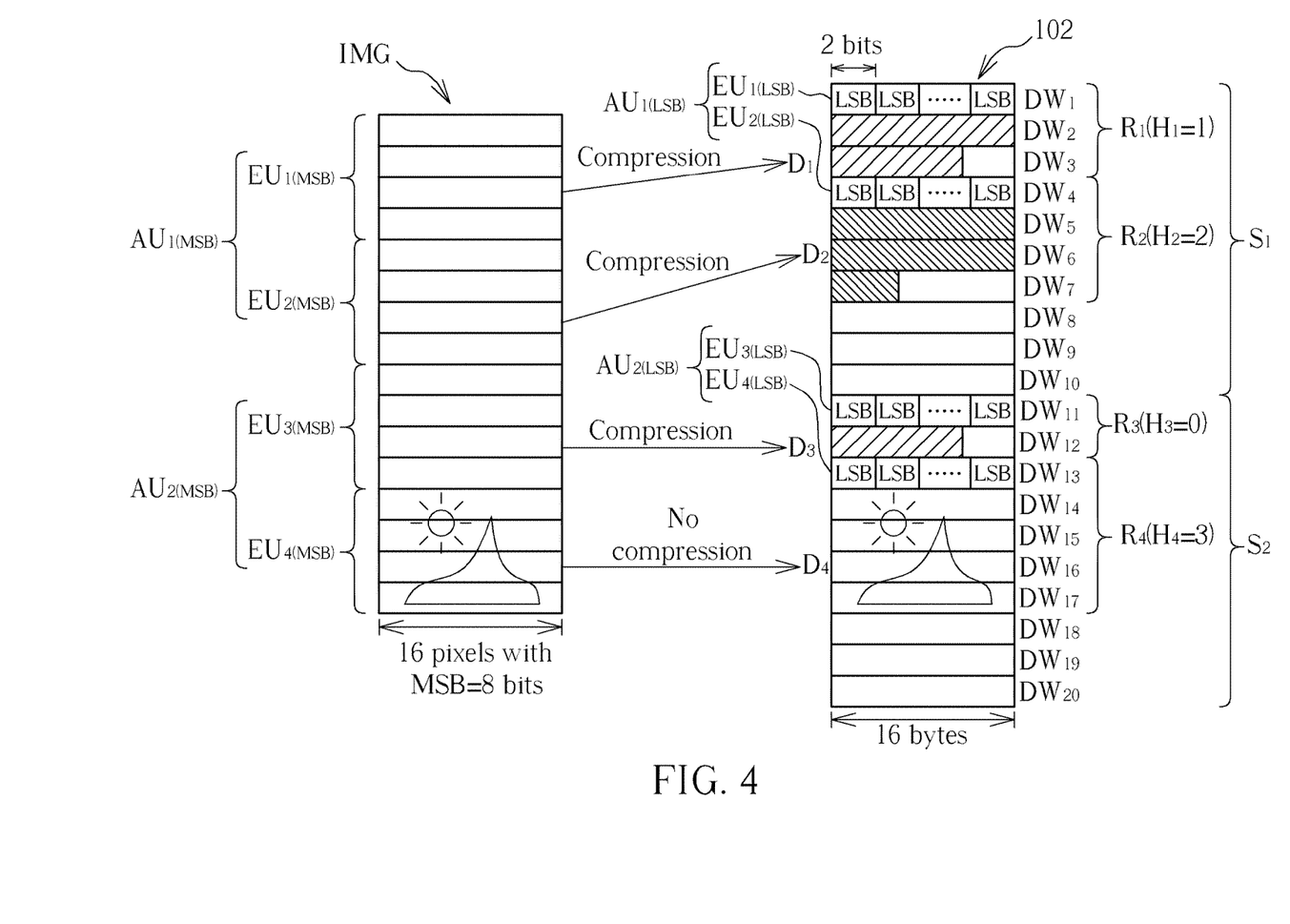
FIG. 4 is a diagram illustrating an exemplary data storage layout in the frame buffer that is used for storing a luminance frame according to another embodiment of the present invention.

FIG. 4 is a diagram illustrating an exemplary data storage layout in the frame buffer 102 that is used for storing a luminance frame according to another embodiment of the present invention. In this example, the image frame IMG is a luminance (Y) frame corresponding to a YUV420 format, the bit depth is 10 bits, the size of each encoding unit is 16×4, and the size of each access unit is 16×8. As mentioned above, each pixel is divided into an MSB part and an LSB part. Hence, each encoding unit includes a first part $EU_{(MSB)}$ composed of MSB parts of 16×4 pixels and a second part $EU_{(LSB)}$ composed of LSB parts of 16×4 pixels. For clarity and simplicity, only two access units $AU_1$ and $AU_2$ and four encoding units $EU_1$, $EU_2$, $EU_3$, $EU_4$ are shown in FIG. 4. Each access unit is divided into a first part $AU_{(MSB)}$ composed of first parts $EU_{(MSB)}$ of encoding units included in the access unit and a second part composed of second parts $EU_{(LSB)}$ of encoding units included in the access unit. Hence, the access unit $AU_1$ includes a first part $AU_{1(MSB)}$ and a second part $AU_{1(LSB)}$, where the first part $AU_{1(MSB)}$ is composed of a first part $EU_{1(MSB)}$ of the encoding unit $EU_1$ and a first part $EU_{2(MSB)}$ of the encoding unit $EU_2$, and the second part $AU_{1(LSB)}$ is composed of a second part $EU_{1(LSB)}$ of the encoding unit $EU_1$ and a second part $EU_{2(LSB)}$ of the encoding unit $EU_2$; and the access unit $AU_2$ includes a first part $AU_{2(MSB)}$ and a second part $AU_{2(LSB)}$, where the first part $AU_{2(MSB)}$ is composed of a first part $EU_{3(MSB)}$ of the encoding unit $EU_3$ and a first part $EU_{4(MSB)}$ of an encoding unit $EU_4$, and the second part $AU_{2(LSB)}$ is composed of a second part $EU_{3(LSB)}$ of the encoding unit $EU_3$ and a second part $EU_{4(LSB)}$ of the encoding unit $EU_4$.

In this example, the frame buffer 102 has two storage spaces $S_1$ and $S_2$ sequentially allocated therein, where the size of the storage space $S_1$ is equal to the size of the access unit $AU_1$, and the size of the storage space $S_1$ is equal to the size of the access unit $AU_2$. Since the access unit size is 16×8×10 bits, the size of each storage space allocated in the frame buffer 102 is set by 16×10 bytes. In this example, the frame buffer 102 is implemented using a DRAM. As shown in FIG. 4, the frame buffer 102 has a plurality of 16-byte DRAM words $DW_1$-$DW_{20}$, where the storage space $S_1$ has an integer number of DRAM words (e.g., $DW_1$-$DW_{10}$), and the storage space $S_2$ also has an integer number of DRAM words (e.g., $DW_{11}$-$DW_{20}$).

In accordance with the compression order (i.e., the encoding order), the encoding units $EU_1$-$EU_4$ will be processed by the compressor 112 of the processing circuit 104 one by one. Hence, the compressor 112 performs data compression (e.g., lossless compression) upon the first part $EU_{1(MSB)}$ of the encoding unit $EU_1$ of the access unit $AU_1$, and generates a data compression result (e.g., a compressed data $D_1$) of the first part $EU_{1(MSB)}$ of the encoding unit $EU_1$. In addition, the compressor 112 directly outputs the uncompressed data of the second part $EU_{1(LSB)}$ of the encoding unit $EU_1$ of the access unit $AU_1$. In this example, the processing circuit 104 finds that the size of the compressed data $D_1$ is larger than 128 bits (i.e., one 16-byte DRAM word) but not larger than 2×128 bits (i.e., two 16-byte DRAM words). Hence, the processing circuit 104 determines that the size of the compressed data $D_1$ is within an acceptable range, and therefore stores an output bitstream, including the compressed data $D_1$ of the first part $EU_{1(MSB)}$ of the encoding unit $EU_1$ and the uncompressed data of the second part $EU_{1(LSB)}$ of the encoding unit $EU_1$, into a region $R_1$ composed of three DRAM words $DW_1$-$DW_3$. By way of example, but not limitation, the uncompressed data of the second part $EU_{1(LSB)}$ of the encoding unit $EU_1$ is stored into the first DRAM word $DW_1$ of the region $R_1$, while the compressed data $D_1$ of the first part $EU_{1(MSB)}$ of the encoding unit $EU_1$ is stored into the next two DRAM words $DW_2$-$DW_3$ of the region $R_1$.

The encoding units $EU_1$ and $EU_2$ are adjacent in the compression order. Next, the compressor 112 performs data compression (e.g., lossless compression) upon the first part $EU_{2(MSB)}$ of the encoding unit $EU_2$ of the access unit $AU_1$, and generates a data compression result (e.g., a compressed data $D_2$) of the first part $EU_{2(MSB)}$ of the encoding unit $EU_2$. In addition, the compressor 112 directly outputs the uncompressed data of the second part $EU_{2(LSB)}$ of the encoding unit $EU_2$ of the access unit $AU_1$. In this example, the processing circuit 104 finds that the size of the compressed data $D_2$ is larger than 2×128 bits (i.e., two 16-byte DRAM words) but not larger than 3×128 bits (i.e., three 16-byte DRAM words). Hence, the processing circuit 104 determines that the size of the compressed data $D_2$ is within the acceptable range, and therefore stores an output bitstream, including the compressed data $D_2$ of the first part of the encoding unit $EU_{2(MSB)}$ of the encoding unit $EU_2$ and the uncompressed data of the second part $EU_{2(LSB)}$ of the encoding unit $EU_2$, into a region $R_2$ composed of four DRAM words $DW_4$-$DW_7$. By way of example, but not limitation, the uncompressed data of the second part $EU_{2(LSB)}$ of the encoding unit $EU_2$ is stored into the first DRAM word $DW_4$ of the region $R_2$, while the compressed data $D_2$ of the first part $EU_{2(MSB)}$ of the encoding unit $EU_2$ is stored into the next three DRAM words $DW_5$-$DW_7$ of the region $R_2$. It should be noted that the regions $R_1$ and $R_2$ are non-overlapping, and each of the regions $R_1$ and $R_2$ has an integer number of DRAM words. As can be seen from FIG. 4, the DRAM word $DW_3$ has a blank area left unused, and the DRAM word $DW_7$ has a blank area left unused. The word-level end address of one stored output bitstream in the region $R_1$ (e.g., an address of the DRAM word $DW_3$) is immediately followed by a word-level start address of another stored output bitstream in the region $R_2$ (e.g., an address of the DRAM word $DW_4$). However, a bit-level end address of one stored output bitstream in the region $R_1$ is not immediately followed by a bit-level start address of another stored output bitstream in the region $R_2$. Specifically, a bit-level end address of the compressed data $D_1$ of the first part $EU_{1(MSB)}$ of the encoding unit $EU_1$ in the storage space $S_1$ is not immediately followed by a bit-level start address of the uncompressed data of the second part $EU_{2(LSB)}$ of the encoding unit $EU_2$ in the same storage space $S_1$. In this way, random access in the storage space $S_1$ of the frame buffer 102 can be achieved based on the DRAM word access.

The encoding units $EU_2$ and $EU_3$ are adjacent in the compression order. Next, the compressor 112 performs data compression (e.g., lossless compression) upon the first part $EU_{3(MSB)}$ of the encoding unit $EU_3$ of the access unit $AU_2$, and generates a data compression result (e.g., a compressed data $D_3$) of the first part $EU_{3(MSB)}$ of the encoding unit $EU_3$. In addition, the compressor 112 directly outputs the uncompressed data of the second part $EU_{3(LSB)}$ of the encoding unit $EU_3$ of the access unit $AU_2$. In this example, the processing circuit 104 finds that the size of the compressed data $D_3$ is not larger than 128 bits (i.e., one 16-byte DRAM word). Hence, the processing circuit 104 determines that the size of the compressed data $D_3$ is within the acceptable range, and therefore stores an output bitstream, including the compressed data $D_3$ of the first part $EU_{3(MSB)}$ of the encoding unit $EU_3$ and the uncompressed data of the second part $EU_{3(LSB)}$ of the encoding unit $EU_3$, into a region $R_3$ composed of two DRAM words $DW_{11}$-$DW_{12}$. By way of example, but not limitation, the uncompressed data of the second part $EU_{3(LSB)}$ of the encoding unit $EU_3$ is stored into the first DRAM word $DW_{11}$ of the region $R_3$, while the compressed data $D_3$ of the first part $EU_{3(MSB)}$ of the encoding unit $EU_3$ is stored into the last DRAM word $DW_{11}$ of the region $R_3$. Though the DRAM words $DW_7$-$DW_{10}$ of the storage space $S_1$ have unused storage areas, the frame 102 is used to store the uncompressed data of the second part $EU_{3(LSB)}$ of the encoding unit $EU_3$ from a start address of another storage space $S_2$. Hence, a word-level end address of an output bitstream (which is generated based on a data compression result of the encoding unit $EU_2$) in the storage space $S_1$ is not immediately followed by a word-level start address of the output bitstream (which is generated based on a data compression result of the encoding unit $EU_3$) in the storage space $S_2$.

The encoding units $EU_3$ and $EU_4$ are adjacent in the compression order. Next, the compressor 112 performs data compression (e.g., lossless compression) upon the first part $EU_{4(MSB)}$ of the encoding unit $EU_4$ of the access unit $AU_2$, and generates a data compression result (e.g., a compressed data) of the first part $EU_{4(MSB)}$ of the encoding unit $EU_4$. In addition, the compressor 112 directly outputs the uncompressed data of the second part $EU_{4(LSB)}$ of the encoding unit $EU_4$ of the access unit $AU_2$. In this example, the processing circuit 104 finds that the size of the compressed data generated from compressing the first part $EU_{4(MSB)}$ of the encoding unit $EU_4$ is larger than 3×128 bits (i.e., three 16-byte DRAM words). Hence, the processing circuit 104 determines that the size of the compressed data is beyond the acceptable range, and therefore stores an output bitstream, including the uncompressed data $D_4$ of the first part $EU_{4(MSB)}$ of the encoding unit $EU_4$ and the uncompressed data of the second part $EU_{4(LSB)}$ of the encoding unit $EU_4$, into a region $R_4$ composed of five DRAM words $DW_{13}$-$DW_{17}$. By way of example, but not limitation, the uncompressed data of the second part $EU_{4(LSB)}$ of the encoding unit $EU_4$ is stored into the first DRAM word $DW_{13}$ of the region $R_4$, while the uncompressed data $D_4$ of the first part $EU_{4(MSB)}$ of the encoding unit $EU_4$ is stored into the next four DRAM words $DW_{14}$-$DW_{17}$ of the region $R_4$. It should be noted that the regions $R_3$ and $R_4$ are non-overlapping, and each of the regions $R_3$ and $R_4$ has an integer number of DRAM words. As can be seen from FIG. 4, the DRAM word $DW_{12}$ has a blank area left unused. The word-level end address of one stored output bitstream in the region $R_3$ (e.g., an address of the DRAM word $DW_{12}$) is immediately followed by a word-level start address of another stored output bitstream in the region $R_4$ (e.g., an address of the DRAM word $DW_{13}$). However, a bit-level end address of one stored output bitstream in the region $R_3$ is not immediately followed by a bit-level start address of another stored output bitstream in the region $R_4$. Specifically, a bit-level end address of the compressed data $D_3$ of the first part $EU_{3(MSB)}$ of the encoding unit $EU_3$ in the storage space $S_2$ is not immediately followed by a bit-level start address of the uncompressed data of the second part $EU_{4(LSB)}$ of the encoding unit $EU_4$ in the storage space $S_2$. In this way, random access in the storage space $S_2$ of the frame buffer 102 can be achieved based on the DRAM word access.

Similarly, to facilitate random access within each storage space, the processing circuit 104 further sets a header of each encoding unit to indicate the number of storage units (e.g., 16-byte DRAM words) included in a region that records an output bitstream generated based on a data compression result of the encoding unit, and stores the header of the encoding unit into the header buffer 108. As mentioned above, a two-bit header is recorded for each 8-bit pixel. When the 8-bit data compression is re-used, the header bit number may be the same. For example, the header of each encoding unit composed of 10-bit pixels may be set based on the following rules.

| Header (2 bits) | Syntax (10-bit video) |
| --- | --- |
| 0 (2'b00) | bitstream size ≤ 2 × 128 bits |
| 1 (2'b01) | 2 × 128 bits < bitstream size ≤ 3 × 128 bits |
| 2 (2'b10) | 3 × 128 bits < bitstream size ≤ 4 × 128 bits |
| 3 (2'b11) | No compression (bitstream size > 4 × 128 bits) |

Hence, as shown in FIG. 4, a two-bit header $H_1$ of the encoding unit $EU_1$ is set by "01" to indicate the second region size, a two-bit header $H_2$ of the encoding unit $EU_2$ is set by "10" to indicate the third region size, a two-bit header $H_3$ of the encoding unit $EU_3$ is set by "00" to indicate the first region size, and a two-bit header $H_4$ of the encoding unit $EU_4$ is set by "11" to indicate the fourth region size.

Figure 5:
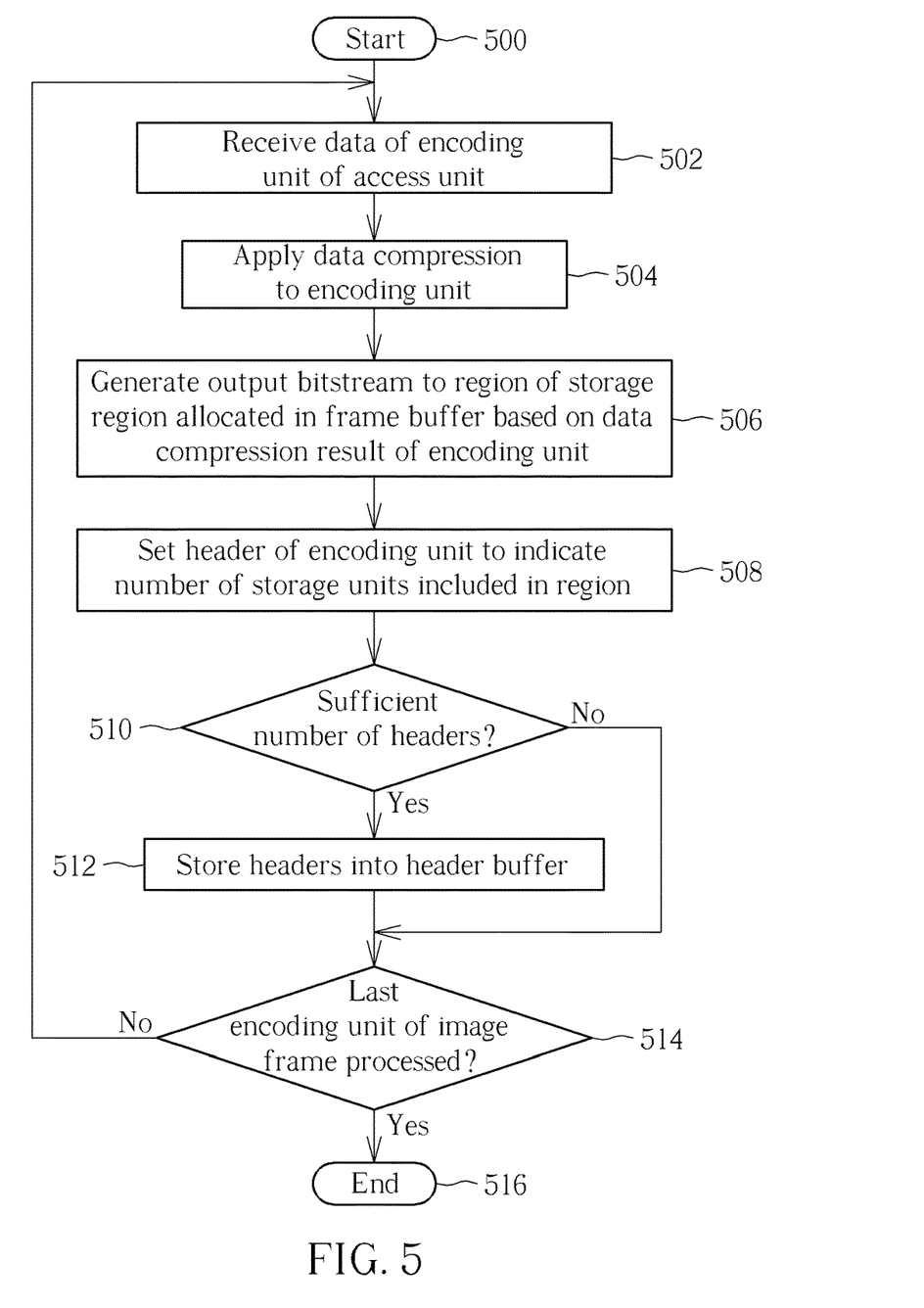
FIG. 5 is a flowchart illustrating a method for writing data of an image frame into a frame buffer according to an embodiment of the present invention.

FIG. 5 is a flowchart illustrating a method for writing data of an image frame into a frame buffer according to an embodiment of the present invention. The frame buffer may employ the proposed data storage layout. Hence, processing results of access units in an image frame are stored in storage spaces allocated in the frame buffer, respectively, where the size of each of the storage spaces is equal to the size of a corresponding access unit. Provided that the result is substantially the same, the steps are not required to be executed in the exact order shown in FIG. 5. The method may be employed by the processing circuit 104, and may be briefly summarized as below.

Step 500: Start.

Step 502: Receive data of an encoding unit of an access unit.

Step 504: Apply data compression to the encoding unit.

Step 506: Generate an output bitstream to a region of a storage region allocated in the frame buffer based on a data compression result of the encoding unit, where the region is composed of an integer number of storage units (e.g., 16-byte DRAM words). For example, when the bit depth is 8 bits, the output bitstream may be a compressed data of the encoding unit if the size of the compressed data of the encoding unit is within an acceptable range, and may be an uncompressed data of the encoding unit if the size of the compressed data of the encoding unit is beyond the acceptable range. For another example, when the bit depth is larger than 8 bits, the output bitstream may be a combination of an uncompressed data of a part of the encoding unit and a compressed data of a remaining part of the encoding unit if the size of the compressed data of the encoding unit is within an acceptable range, and may be a combination of the part of the encoding unit and an uncompressed data of the remaining part of the encoding unit if the size of the compressed data of the encoding unit is beyond the acceptable range. The part of the encoding unit is a collection of specific bits (e.g., LSBs) selected from every pixel in the encoding unit.

Step 508: Set a header of the encoding unit to indicate the number of storage units included in the region. In one exemplary design, the header may be stored into an external header buffer (e.g., DRAM) for later use.

Step 510: Check if there are a sufficient number of headers waiting to be stored. If yes, go to step 512; otherwise, go to step 514.

Step 512: Store the headers into a header buffer.

Step 514: Is the last encoding unit of the last access unit in the image frame processed? If yes, go to step 516; otherwise, go to step 502.

Step 516: End.

Since a bit length of a header of each encoding unit is short, the processing circuit 104 does not store a small-sized header into the header buffer 108 each time the small-sized header is set. Instead, the processing circuit 104 may collect small-sized headers of multiple encoding units, and store the collected small-sized headers into the header buffer 108 when the data amount of the collected small-sized headers is large enough (steps 510 and 512). In this way, the efficiency of writing header data into the header buffer can be improved. As a person skilled in the art can readily understand details of each step shown in FIG. 5 after reading above paragraphs, further description is omitted here for brevity.

Figure 6:
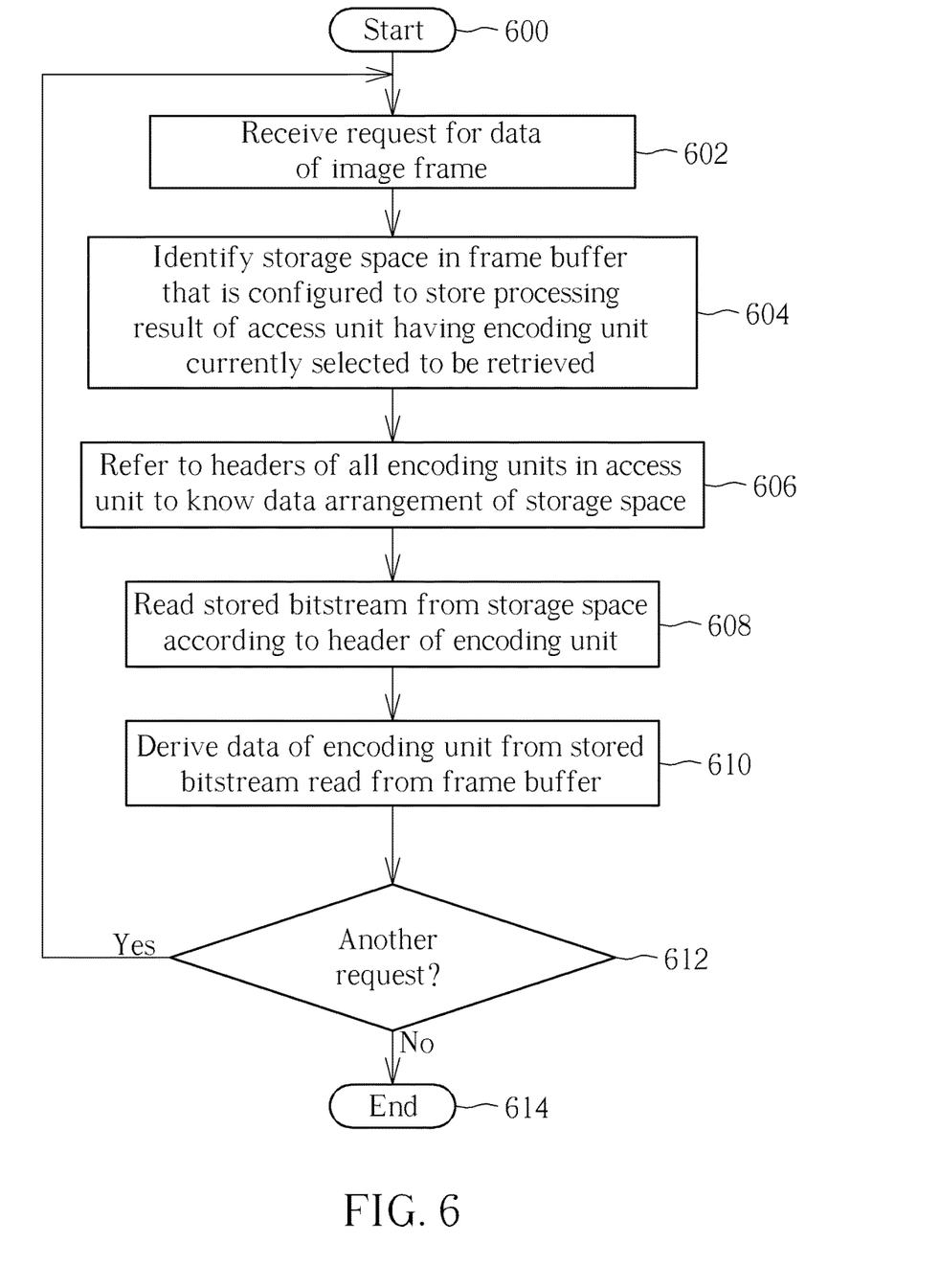
FIG. 6 is a flowchart illustrating a method for obtaining data of an image frame from a frame buffer according to an embodiment of the present invention.

FIG. 6 is a flowchart illustrating a method for obtaining data of an image frame from a frame buffer according to an embodiment of the present invention. The frame buffer may employ the proposed data storage layout. Hence, processing results of access units in an image frame are stored in storage spaces allocated in the frame buffer, respectively, where the size of each of the storage spaces is equal to the size of a corresponding access unit. Provided that the result is substantially the same, the steps are not required to be executed in the exact order shown in FIG. 6. The method may be employed by any of the processing circuits 106_1-106_N, and may be briefly summarized as below.

Step 600: Start.

Step 602: Receive a request for data of an encoding unit in an image frame.

Step 604: Identify a storage space in the frame buffer that is arranged to store a processing result of an access unit having an encoding unit to be retrieved.

Step 606: Refer to headers of all encoding units in the access unit to know the actual data arrangement of the storage space. In one exemplary design, the headers may be read from an external header buffer (e.g., DRAM).

Step 608: Read a stored output bitstream from the storage space according to a header of the encoding unit. For example, when the bit depth is 8 bits, the stored output bitstream may be a compressed data of the encoding unit if the size of the compressed data of the encoding unit is within an acceptable range, and may be an uncompressed data of the encoding unit if the size of the compressed data of the encoding unit is beyond the acceptable range. For another example, when the bit depth is larger than 8 bits, the stored output bitstream may be a combination of an uncompressed data of apart of the encoding unit and a compressed data of a remaining part of the encoding unit if the size of the compressed data of the encoding unit is within an acceptable range, and may be a combination of the part of the encoding unit and an uncompressed data of the remaining part of the encoding unit if the size of the compressed data of the encoding unit is beyond the acceptable range. The part of the encoding unit is a collection of specific bits (e.g., LSBs) selected from every pixel in the encoding unit.

Step 610: Derive data of the encoding unit from the stored output bitstream retrieved from the frame buffer.

Step 612: Is another request for data of a different encoding unit in the image frame received?

Step 614: End.

As a person skilled in the art can readily understand details of each step shown in FIG. 6 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for storing data of an image frame into a frame buffer, comprising:

receiving the image frame from a video decoder;

dividing the image frame into a plurality of access units, each having at least one encoding unit, wherein each encoding unit is a unit for data compression, each access unit is a partial image frame, and each encoding unit is a partial image frame; and performing the data compression, by a processing circuit, upon each encoding unit of the image frame, and generating an output bitstream to the frame buffer based on a data compression result of the encoding unit;

wherein a processing result of each access unit includes each output bitstream of the at least one encoding unit included in the access unit; a plurality of processing results of the access units are stored in a plurality of storage spaces allocated in the frame buffer, respectively; a size of each of the storage spaces is equal to a size of a corresponding access unit; when at least one output bitstream of at least one encoding unit included in one of the access units is set by uncompressed data according to at least one data compression result of the at least one encoding unit, a processing result of said one of the access units comprises the uncompressed data and is stored in one of the storage spaces; and when the at least one output bitstream of the at least one encoding unit included in said one of the access units is set by compressed data according to the at least one data compression result of the at least one encoding unit, the processing result of said one of the access units comprises the compressed data, the compressed data is stored in said one of the storage spaces, and said one of the storage spaces has at least one blank storage area that is left unused; a same storage space with a size equal to a size of said one of the access units stores the compressed data when the at least one output bitstream of the at least one encoding unit is set by the compressed data, and stores the uncompressed data when the at least one output bitstream of the at least one encoding unit is set by the uncompressed data.

2. The method of claim 1, wherein a processing result of a specific access unit of the access units comprises a compressed data of a first encoding unit; the compressed data of the first encoding unit is stored into a first region of a specific storage space allocated in the frame buffer; the specific storage space is divided into a plurality of storage units each having a same size; and a number of storage units included in the first region is an integer value.

3. The method of claim 2, further comprising:

setting a header of the first encoding unit to indicate the number of storage units included in the first region; and storing the header of the first encoding unit into a header buffer.

4. The method of claim 2, wherein the processing result of the specific access unit further comprises an output bitstream generated based on a data compression result of a second encoding unit; the first encoding unit and the second encoding unit are adjacent in a compression order; the output bitstream of the second encoding unit is stored into a second region of the specific storage space; the first region and the second region are non-overlapping; and a number of storage units included in the second region is an integer value.

5. The method of claim 1, wherein a processing result of a specific access unit of the access units comprises an uncompressed data of a first encoding unit; and the uncompressed data of the first encoding unit is stored into a first region of a specific storage space allocated in the frame buffer; the specific storage space is divided into a plurality of storage units each having a same size; and a number of storage units included in the first region is an integer value.

6. The method of claim 5, further comprising:
setting a header of the first encoding unit to indicate the number of storage units included in the first region; and
storing the header of the first encoding unit into a header buffer.

7. The method of claim 5, wherein the processing result of the specific access unit further comprises an output bitstream generated based on a data compression result of a second encoding unit; the first encoding unit and the second encoding unit are adjacent in a compression order; the output bitstream of the second encoding unit is stored into a second region of the specific storage space; the first region and the second region are non-overlapping; and a number of storage units included in the second region is an integer value.

8. The method of claim 1, wherein a processing result of a specific access unit of the access units comprises an output bitstream of a first encoding unit that includes an uncompressed data of a part of the first encoding unit and a compressed data of a remaining part of the first encoding unit; the part of the first encoding unit is a collection of specific bits selected from every sample in the first encoding unit; the uncompressed data of the part of the first encoding unit and the compressed data of the remaining part of the first encoding unit are separately stored into first storage unit or units and second storage unit or units in a first region of a specific storage space allocated in the frame buffer; the specific storage space is divided into a plurality of storage units each having a same size; and a number of storage units included in the first region is an integer value.

9. The method of claim 8, further comprising:
setting a header of the first encoding unit to indicate the number of storage units included in the first region; and
storing the header of the first encoding unit into a header buffer.

10. The method of claim 8, wherein the specific bits are least significant bits.

11. The method of claim 8, wherein the processing result of the specific access unit further comprises an output bitstream of a second encoding unit that includes an uncompressed data of a part of the second encoding unit and data generated based on a data compression result of a remaining part of the second encoding unit; the part of the second encoding unit is a collection of specific bits selected from every sample in the second encoding unit; and the output bitstream of the second encoding unit is stored into a second region of the specific storage space; the first encoding unit and the second encoding unit are adjacent in a compression order; the first region and the second region are non-overlapping; and a number of storage units included in the second region is an integer value.

12. The method of claim 1, wherein a processing result of a specific access unit of the access units comprises an output bitstream of a first encoding unit that includes an uncompressed data of a part of the first encoding unit and an uncompressed data of a remaining part of the first encoding unit; the part of the first encoding unit is a collection of specific bits selected from every sample in the first encoding unit; the uncompressed data of the part of the first encoding unit and the uncompressed data of the remaining part of the first encoding unit are separately stored into first storage unit or units and second storage unit or units in a first region of a specific storage space allocated in the frame buffer; the specific storage space is divided into a plurality of storage units each having a same size; and a number of storage units included in the first region is an integer value.

13. The method of claim 12, further comprising:
setting a header of the first encoding unit to indicate the number of storage units included in the first region; and
storing the header of the first encoding unit into a header buffer.

14. The method of claim 12, wherein the specific bits are least significant bits.

15. The method of claim 12, wherein the processing result of the specific access unit further comprises an output bitstream of a second encoding unit that includes an uncompressed data of a part of the second encoding unit and data generated based on a data compression result of a remaining part of the second encoding unit; the part of the second encoding unit is a collection of specific bits selected from every sample in the second encoding unit; the output bitstream of the second encoding unit is stored into a second region of the specific storage space; the first encoding unit and the second encoding unit are adjacent in a compression order; the first region and the second region are non-overlapping; and a number of storage units included in the second region is an integer value.

16. The method of claim 1,
wherein the image frame includes a first encoding unit and a second encoding unit; compressed data of the first encoding unit and uncompressed data of the second encoding unit are both stored in the frame buffer, and a blank storage area is left unused between a bit-level end address of the compressed data of the first encoding unit stored in the frame buffer and a bit-level start address of the uncompressed data of the second encoding unit stored in the frame buffer.

17. A method for obtaining data of an image frame from a frame buffer, comprising:
reading a stored output bitstream, by a processing circuit, from a specific storage space of a plurality of storage spaces allocated in the frame buffer, wherein the stored output bitstream is generated based on a data compression result of a specific encoding unit of a specific access unit, the image frame is divided into a plurality of access units each having at least one encoding unit, each encoding unit is a unit for data compression, each access unit is a partial image frame, each encoding unit is a partial image frame, a processing result of each access unit includes each output bitstream of the at least one encoding unit included in the access unit, a plurality of processing results of the access units are stored in the storage spaces, respectively, a size of each of the storage spaces is equal to a size of a corresponding access unit, when at least one output bitstream of at least one encoding unit included in one of the access units is set by uncompressed data according to at least one data compression result of the at least one encoding unit, a processing result of said one of the access units comprises the uncompressed data and is stored in one of the storage spaces, and when the at least one output bitstream of the at least one encoding unit included in said one of the access units is set by compressed data according to the at least one data compression result of the at least one encoding unit, the processing result of said one of the access units comprises the compressed data, the compressed data is stored in said one of the storage spaces, and said one of the storage spaces has at least one blank storage area that is left unused; a same storage space with a size equal to a size of said one of the access units stores the compressed data when the at least one output bitstream of the at least one encoding unit is set by the compressed data, and stores the uncompressed data when the at least one output bitstream of the at least one encoding unit is set by the uncompressed data;
deriving data of the encoding unit from the stored output bitstream read from the frame buffer; and
outputting the data of the encoding unit read from the frame buffer to at least one processor, wherein the at least one processor comprises at least one of an image processor and a display processor.

18. The method of claim 17, wherein the specific storage space is divided into a plurality of storage units each having a same size; the stored output bitstream includes a compressed data of the specific encoding unit, and is read from a region of the specific storage space; and the region is composed of an integer number of storage units.

19. The method of claim 18, further comprising:
reading a header of the specific encoding unit from a header buffer; and
determining the number of the storage units according to the header of the specific encoding unit.

20. The method of claim 17, wherein the specific storage space is divided into a plurality of storage units each having a same size; the stored output bitstream includes an uncompressed data of the specific encoding unit, and is read from a region of the specific storage space; and the region is composed of an integer number of storage units.

21. The method of claim 20, further comprising:
reading a header of the specific encoding unit from a header buffer; and
determining the number of storage units according to the header of the specific encoding unit.

22. The method of claim 17, wherein the specific storage space is divided into a plurality of storage units each having a same size; the stored output bitstream has an uncompressed data of a part of the specific encoding unit and a compressed data of a remaining part of the specific encoding unit that are separately stored in first storage unit or units and second storage unit or units in a region of the specific storage space; the part of the specific encoding unit is a collection of specific bits selected from every sample in the specific encoding unit; and the region is composed of an integer number of storage units.

23. The method of claim 22, further comprising:
reading a header of the specific encoding unit from a header buffer; and
determining the number of the storage units according to the header of the specific encoding unit.

24. The method of claim 22, wherein the specific bits are least significant bits.

25. The method of claim 17, wherein the specific storage space is divided into a plurality of storage units each having a same size; the stored output bitstream has an uncompressed data of a part of the specific encoding unit and an uncompressed data of a remaining part of the specific encoding unit that are separately stored in first storage unit or units and second storage unit or units in a region of the specific storage space; the part of the specific encoding unit is a collection of specific bits selected from every sample in the specific encoding unit; and the region is composed of an integer number of storage units.

26. The method of claim 25, further comprising:
reading a header of the specific encoding unit from a header buffer; and
determining the number of the storage units according to the header of the specific encoding unit.

27. The method of claim 25, wherein the specific bits are least significant bits.

28. The method of claim 17,
wherein the image frame includes a first encoding unit and a second encoding unit compressed data of the first encoding unit and uncompressed data of the second encoding unit are both stored in the frame buffer, and a blank storage area is left unused between a bit-level end address of the compressed data of the first encoding unit stored in the frame buffer and a bit-level start address of the uncompressed data of the second encoding unit stored in the frame buffer.

29. An image frame buffering apparatus, comprising:
a frame buffer; and
a processing circuit, configured to receive an image frame from a video decoder and divide the image frame into a plurality of access units, each having at least one encoding unit, wherein each encoding unit is a unit for data compression, each access unit is a partial image frame, and each encoding unit is a partial image frame; and further configured to perform the data compression upon each encoding unit of the image frame, and generate an output bitstream to the frame buffer based on a data compression result of the encoding unit;
wherein a processing result of each access unit includes each output bitstream of the at least one encoding unit included in the access unit; the processing circuit stores a plurality of processing results of the access units in a plurality of storage spaces allocated in the frame buffer, respectively; a size of each of the storage spaces is equal to a size of a corresponding access unit; and when at least one output bitstream of at least one encoding unit included in one of the access units is set by uncompressed data according to at least one data compression result of the at least one encoding unit, a processing result of said one of the access units comprises the uncompressed data and is stored in one of the storage spaces; and when the at least one output bitstream of the at least one encoding unit included in said one of the access units is set by compressed data according to the at least one data compression result of the at least one encoding unit, the processing result of said one of the access units comprises the compressed data, the compressed data is stored in said one of the storage spaces, and said one of the storage spaces has at least one blank storage area that is left unused; a same storage space with a size equal to a size of said one of the access units stores the compressed data when the at least one output bitstream of the at least one encoding unit is set by the compressed data, and stores the uncompressed data when the at least one output bitstream of the at least one encoding unit is set by the uncompressed data.

30. The image frame buffering apparatus of claim 29, wherein the image frame includes a first encoding unit and a second encoding unit; and compressed data of the first encoding unit and uncompressed data of the second encoding unit are both stored in the frame buffer, and a blank storage area is left unused between a bit-level end address of the compressed data of the first encoding unit stored in the frame buffer and a bit-level start address of the uncompressed data of the second encoding unit stored in the frame buffer.

31. An image frame buffering apparatus, comprising:
a frame buffer; and
a processing circuit, configured to read a stored output bitstream from a specific storage space of a plurality of storage spaces allocated in the frame buffer, derive data of the encoding unit from the stored output bitstream read from the frame buffer, and output the data of the encoding unit read from the frame buffer to at least one processor, wherein the at least one processor comprises at least one of an image processor and a display processor;
wherein the stored output bitstream is generated based on a data compression result of a specific encoding unit of a specific access unit, an image frame is divided into a plurality of access units each having at least one encoding unit, each encoding unit is a unit for data compression, each access unit is a partial image frame, each encoding unit is a partial image frame, a processing result of each access unit includes each output bitstream of the at least one encoding unit included in the access unit, a plurality of processing results of the access units are stored in the storage spaces, respectively, a size of each of the storage spaces is equal to a size of a corresponding access unit, when at least one output bitstream of at least one encoding unit included in one of the access units is set by uncompressed data according to at least one data compression result of the at least one encoding unit, a processing result of said one of the access units comprises the uncompressed data and is stored in one of the storage spaces, and when the at least one output bitstream of the at least one encoding unit included in said one of the access units is set by compressed data according to the at least one data compression result of the at least one encoding unit, the processing result of said one of the access units comprises the compressed data, the compressed data is stored in said one of the storage spaces, and said one of the storage spaces has at least one blank storage area that is left unused; a same storage space with a size equal to a size of said one of the access units stores the compressed data when the at least one output bitstream of the at least one encoding unit is set by the compressed data, and stores the uncompressed data when the at least one output bitstream of the at least one encoding unit is set by the uncompressed data.

32. The image frame buffering apparatus of claim 31, wherein the image frame includes a first encoding unit and a second encoding unit, compressed data of the first encoding unit and uncompressed data of the second encoding unit are both stored in the frame buffer, and a blank storage area is left unused between a bit-level end address of the compressed data of the first encoding unit stored in the frame buffer and a bit-level start address of the uncompressed data of the second encoding unit stored in the frame buffer.

* * * * *